United States Patent [19]

Marcolina

[11] 4,363,184
[45] Dec. 14, 1982

[54] DISPOSABLE RODENT TRAP

[75] Inventor: Gene A. Marcolina, Wyndmoor, Pa.

[73] Assignee: Gordon D. Holl, North Wales, Pa. ; a part interest

[21] Appl. No.: 178,962

[22] Filed: Aug. 18, 1980

[51] Int. Cl.³ .......................................... A01M 23/00
[52] U.S. Cl. ....................................................... 43/85
[58] Field of Search ................. 43/63, 77, 79, 85, 81

[56] References Cited
U.S. PATENT DOCUMENTS

| | | | |
|---|---|---|---|
| 441,677 | 12/1890 | Lovell | 43/58 |
| 443,975 | 12/1890 | Pead | 43/61 |
| 691,301 | 1/1902 | Tschantre | 43/61 |
| 1,372,663 | 3/1921 | Albers et al. | 43/61 |
| 1,454,998 | 5/1923 | Haege | 43/61 |
| 1,703,990 | 3/1929 | Daniels | 43/61 |
| 2,481,800 | 9/1949 | Tyler | 43/85 |
| 2,506,055 | 5/1950 | Benson | 43/85 |
| 2,669,056 | 2/1954 | Lehman | 43/79 |
| 2,774,175 | 12/1956 | Maddocks | 43/61 |
| 2,793,464 | 5/1957 | Bird | 43/61 |
| 2,803,918 | 8/1957 | Hall | 43/61 |
| 2,869,280 | 1/1959 | Dobratz | 43/77 |
| 3,177,608 | 4/1965 | Lindelow | 43/61 |
| 3,426,470 | 2/1969 | Rudolph | 43/61 |
| 3,733,735 | 5/1973 | Hirsch | 43/61 |
| 3,823,504 | 7/1974 | Dosch | 43/61 |
| 3,975,857 | 8/1976 | Branson et al. | 43/61 |
| 4,142,320 | 3/1979 | Marcolina et al. | 43/61 |
| 4,144,667 | 3/1979 | Souza | 43/61 |
| 4,216,606 | 8/1980 | Kaiser et al. | 43/83 |
| 4,231,179 | 11/1980 | Hillesland | 43/42.06 |
| 4,231,180 | 11/1980 | Bare | 43/61 |
| 4,238,902 | 12/1980 | Holl et al. | 43/61 |

Primary Examiner—Stephen G. Kunin
Assistant Examiner—K. Bradford Adolphson
Attorney, Agent, or Firm—Howson and Howson

[57] ABSTRACT

A portable, disposable rodent trap comprises a housing having an internal, elongated tunnel-like passageway and an entrance opening through which a rodent can enter the passageway, apparatus secured within the passageway for strangling the rodent, and apparatus, triggerable by the rodent, for activating the strangling apparatus, the strangling apparatus being located at a distance from the entrance opening such that substantially the entire body of the rodent is located within the passageway when the strangling apparatus is activated and in contact with the neck of the rodent.

3 Claims, 12 Drawing Figures

DISPOSABLE RODENT TRAP

BRIEF SUMMARY OF THE INVENTION

This invention relates to animal traps and specifically to a portable, disposable rodent trap having the ability to trap and kill mice and other obnoxious rodents and of enclosing the dead rodent so that the trap and rodent can be disposed of together without the need for handling the rodent.

Various disposable traps have been proposed in the past. For example, in U.S. Pat. No. 4,142,320, dated Mar. 6, 1979, Gordon D. Holl and I described a disposable mousetrap comprising an elongated plastic housing having an air-tight swinging door biased toward its closed condition by a rubber band. The trap has a trigger mechanism which, when actuated by a mouse, allows the door to close, thereby trapping the mouse, and causing death by asphyxiation.

A similar trap, having an improved construction, is described in the pending application of Gordon D. Holl and myself, Ser. No. 31,510, filed Apr. 19, 1979, and now U.S. Pat. No. 4,238,902, dated Dec. 16, 1980. This trap also depends upon asphyxiation.

U.S. Pat. No. 4,144,667, dated Mar. 20, 1979 describes a disposable rodent trap comprising an enclosure with an internal, pivoted inclined plane which operates a door and effects latching thereof after a rodent enters the enclosure. According to the patentee, killing of the captured rodent is preferably accomplished by using a bait including a conventional rodenticide to poison the animal after capture.

Various other imprisonment-type traps have been proposed, as exemplified by the following U.S. patents:

U.S. Pat. No. 441,677, W. S. Lovell
U.S. Pat. No. 443,975, W. Pead
U.S. Pat. No. 691,301, E. L. Tschantre
U.S. Pat. No. 1,372,663, C. C. Albers et al.
U.S. Pat. No. 1,454,998, L. Haege
U.S. Pat. No. 1,703,990, J. J. Daniels
U.S. Pat. No. 2,774,175, E. L. Maddocks
U.S. Pat. No. 2,793,464, B. M. Bird
U.S. Pat. No. 2,803,918, R. J. Hall
U.S. Pat. No. 3,177,608, W. A. Lindelow
U.S. Pat. No. 3,426,470, F. S. Rudolph
U.S. Pat. No. 3,733,735, C. B. Hirsch
U.S. Pat. No. 3,975,857, D. M. Branson et al.

Another well-known form of trap is the choking-type trap exemplified by the well-known Victor "Four-Way" trap. In these traps, a spring-loaded wire loop is actuated by a trigger to choke the mouse to death.

Imprisonment traps of the suffocation type are generally effective, but must be carefully constructed in order to operate reliably. Otherwise, air leaks are likely to develop which prevent these traps from operating properly.

Poison bait can be used in a disposable trap, as suggested in U.S. Pat. No. 4,144,667. However, the use of poison presents a danger to young children and pets.

Choking traps of the wire-loop type do not enclose the animal, are generally considered not disposable, and are also potentially harmful to small children, who can injure their fingers by placing them in the wire loop of a trap in the set condition.

As is evident from the art discussed above, there is a need for a disposable rodent trap, which encloses the rodent, and which kills the rodent more quickly and more reliably than traps of the suffocation or poison type. A choking mechanism is more effective for killing. However, heretofore, no one has successfully incorporated a choking mechanism into an enclosure-type trap, while making the trap sufficiently inexpensive to be considered disposable.

The objects of this invention include the following, and all combinations thereof:
(a) to provide a rodent trap which kills by strangulation, and which encloses the body of the dead rodent substantially completely so that it need not be handled directly;
(b) to provide a rodent trap which is sufficiently inexpensive to be considered disposable;
(c) to provide a trap which, while disposable, is capable of being reused, if desired;
(d) to provide a trap which is easily molded from synthetic plastic;
(e) to provide a trap which is reliable in its operation;
(f) to provide a trap which is safe for children;
(g) to provide a trap which is easily set;
(h) to provide a trap which cannot injure the user when it is being set;
(i) to provide a trap which is unlikely to be triggered accidentally; and
(j) to provide a trap which kills rodents quickly and effectively.

The trap in accordance with the invention comprises a housing having an internal, elongated tunnel-like passageway and an entrance opening through which a rodent can enter the passageway. Strangling means are secured within the passageway at a location remote from the entrance opening. The strangling means is activated by means which can be triggered by the rodent, and the strangling means is located at a distance from the entrance opening such that substantially the entire body of the rodent is located within the passageway when the strangling means is activated and in contact with the neck of the rodent. Thus, the body of the dead rodent is substantially completely enclosed within the trap, and the trap and rodent together can be disposed of without direct contact with the rodent.

Preferably, the housing has a movable wall, and the strangling means comprises a blade which is either part of the movable wall or of another wall of the passageway. The blade edge extends transverse to the direction of elongation of the passageway and cooperates with means opposed to the edge of the blade to compress the neck of the rodent. A detent is provided to hold the movable wall in a position such that the rodent can move its head between the blade edge and the opposed means to actuate a trigger. When the trigger is actuted, the blade is urged toward the opposed means, and the rodent is choked to death, while inside the housing.

Preferably, the trigger comprises an element hinged to the movable wall, and in the preferred embodiment of the invention, all of the elements are integrally molded together except for the means used for urging the blade toward its choking position. The movable wall is connected to the remaining parts of the housing by an integrally molded flexible hinge, and is openable to an extent such as to permit release of the trap from the mold. In this way, substantially the entire trap can be molded as a unit.

Various other objects, details, and advantages of the invention will be apparent from the following detailed description, when read in conjunction with the drawings.

DETAILED DESCRIPTION

Figure 1:
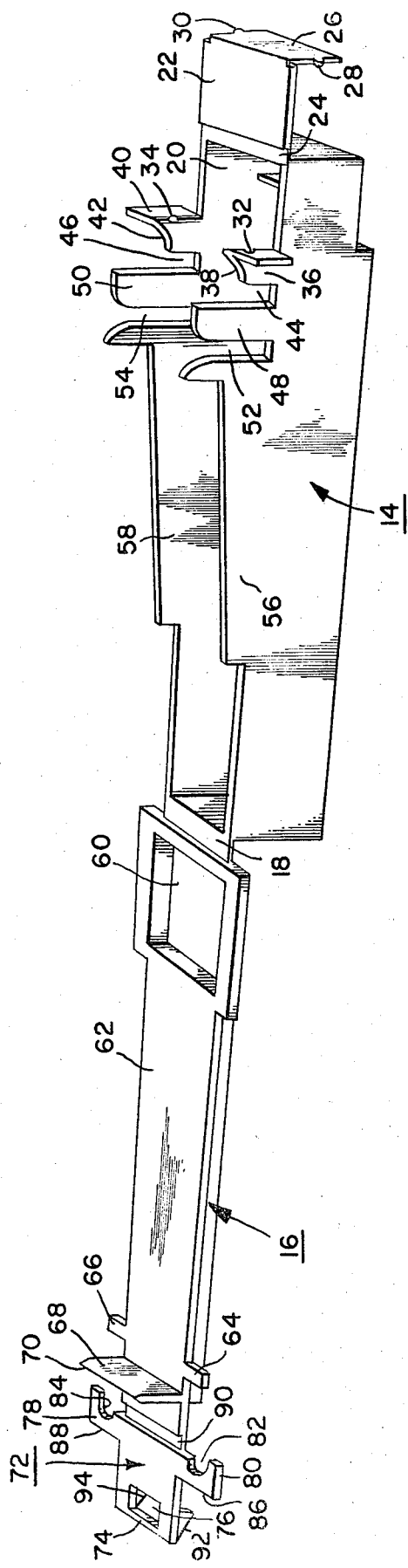
FIG. 1 is an oblique perspective view showing a first version of the trap in the condition in which it is removed from a mold.

FIG. 1 shows a housing comprising a horizontally elongated open-top box 14 having a closure 16 connected to one of its narrow ends by a flexible hinge 18. These elements are made from a synthetic plastic such as polyethylene or polypropylene, and are integrally molded together. The hinge 18 is merely a thin, flexible plastic strip, while the other elements are sufficiently thick as to be relatively inflexible. Hinge 18 allows closure 16 to be brought into juxtaposition with the opening of box 14, as shown in FIG. 2 to form an enclosure.

Opening 20, as shown in FIG. 1 at the right-hand end of box 14, is closed by closure member 22, connected to the right-hand end of box 14 through a flexible, integrally molded hinge 24. The purpose of this closure is to prevent rodents from having direct access to the bait within the right-hand end of the box, and to allow bait to be placed in the box easily. A vertical barrier 26, extending downwardly from the edge of element 22 opposite hinge 24 prevents direct access to the trigger mechanism of the trap as will be apparent. It is provided with two integrally formed projections 28 and 30 on its opposite vertical edges which cooperate respectively with dimples 32 and 34 to hold closure 22 in place by a snap fit. Dimples 32 and 34 are provided respectively in elements 36 and 40, which extend upwardly from the upper edges of box 14 on the opposite long sides thereof. The dimples and projections are exaggerated in the drawing for clarity.

Upstanding elements 36 and 40 have curved upper edges 38 and 42, which serve as detents for the trigger mechanism. Behind upstanding element 36, a slot 44 is formed. Likewise, behind element 40, there is formed a slot 46. These slots allow the cooperative detent members of the closure mechanism to fall off the ends of curved edges 38 and 42 when the trigger mechanism is activated. To the left of these slots are upstanding elements 48 and 50, behind which are formed respectively slots 52 and 54. These latter slots receive laterally extending tabs on the closure which serve to prevent excessive longitudinal movement of the closure.

Figure 2:
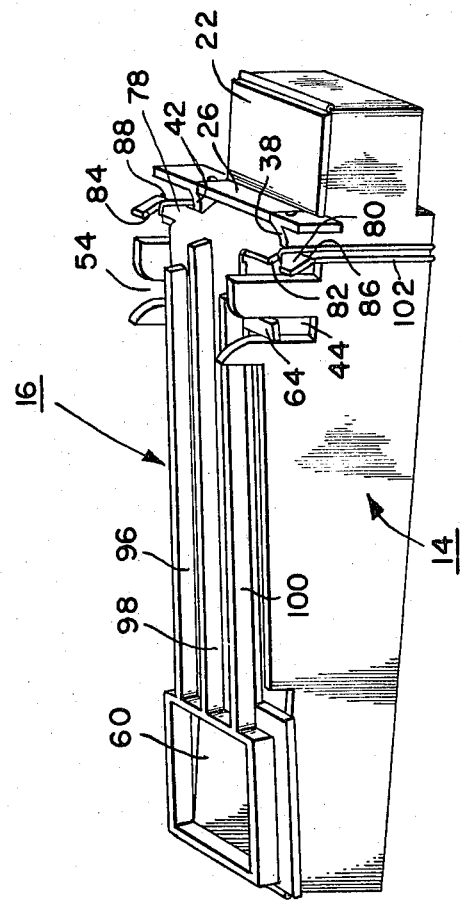
FIG. 2 is an oblique perspective view of the same trap in its set condition.

The left-hand boundaries of these slots are constituted respectively by upstanding ends of wall elements 56 and 58, which serve as barriers to access to the interior of the box when the trap is in the set condition, as shown in FIG. 2.

The closure 16 has an entrnce opening 60, through which a rodent can enter the trap. Extending to the left from opening 60, as shown in FIG. 1, is a wall 62, which constitutes the movable wall of the device. Extending laterally from this movable wall are integrally formed tabs 64 and 66, which cooperate with slots 52 and 54, as shown in FIG. 2.

A blade 68 is integrally formed on wall 62. Its edge 70 extends in a direction transverse to the long dimension of the trap.

A trigger element 72 is provided with a bar 74, located to the left of opening 76. This bar is of a size such that a rodent can easily engage it with its mouth. It has been found that rodents such as mice, when faced with an obstacle which can be grasped in their mouths, will almost invariably do so, and attempt to pull the obstruction out of the way in order to reach their objective. As will be apparent from the description below, the trap is activated when the rodent pulls on bar 74. Trigger element 72 has two laterally extending tabs 78 and 80 having slots 82 and 84 for receiving a rubber band, which serves to urge the closure toward the closed condition. These tabs also have edges 86 and 88 which cooperate respectively with curved edges 38 and 42 to hold the movable wall in the set position. Trigger element 72 is connected through integrally molded hinge 90 to the end of wall 62.

Wedge-shaped elements 92 and 94 on trigger element 72 cooperate with closure 22 to prevent movable wall 62 from being opened beyond certain limits when the trap is set.

Referring to FIG. 2, movable wall 16 is provided with integrally molded reinforcing ribs 96, 98 and 100. Rubber band 102 extends from slot 82 in element 80, underneath the body of the trap to slot 84 in element 78.

Figure 3:
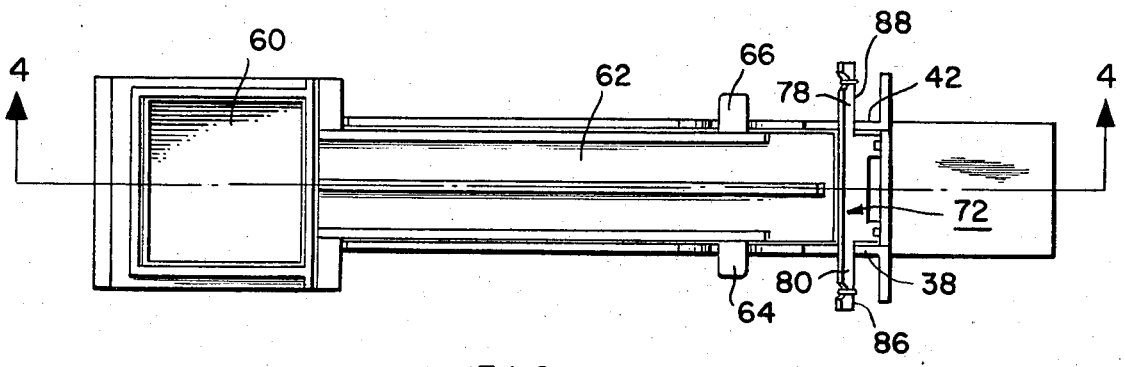
FIG. 3 is a top plan view of the same trap in its set condition.
Figure 4:
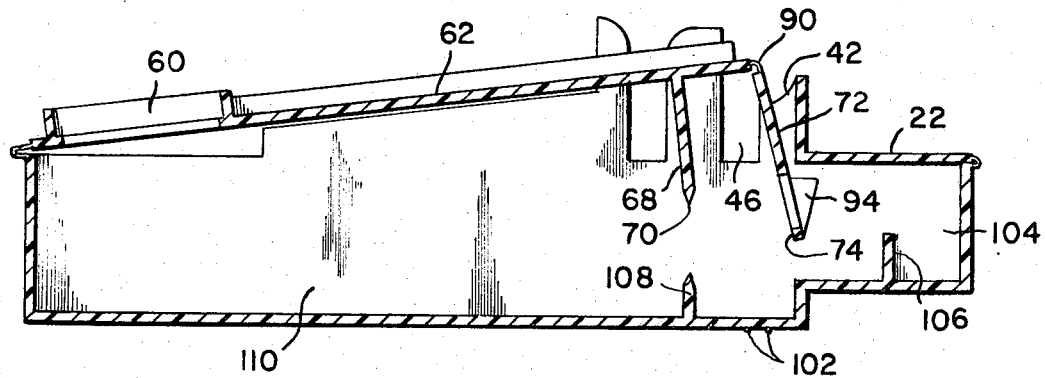
FIG. 4 is a vertical section taken on the plane 4-4 of FIG. 3.

Referring to FIGS. 3 and 4, movble wall 62 is held in the set condition by the engagement of edge 88 with edge 42 and by the engagement of edge 86 with edge 38. As shown in FIG. 4, a bait compartment 104, underneath closure 22, is provided with a barrier 106 to retain bait at the extreme end of the trap. A blade 108, opposed to blade 68 extends upwardly from the bottom wall of the box.

Figure 5:
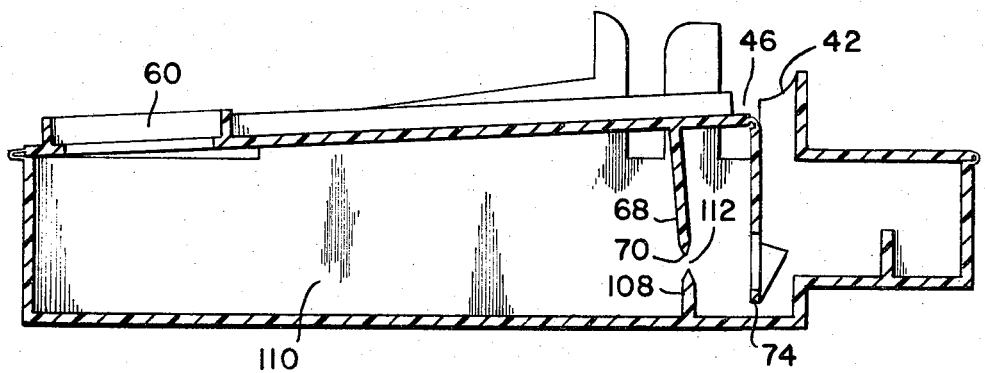
FIG. 5 is a vertical section taken longitudinally through the trap, and showing the trap in its triggered condition.

A rodent entering the box through opening 60 must crawl through an elongated, tunnel-like passage 110, and place his head through the space between movable blade 68 and its opposed blade 108 in order to reach bait compartment 104. Bar 74 is in the way, and accordingly, the rodent will attempt to grasp the bar with its mouth. When this happens, the rodent will pull on bar 74, and thereby move trigger element 72 in such a way that tab 88 clears detent edge 42, and tab 86 likewise clears detent edge 38. Tab 78 falls into its slot 46, and tab 80 falls into slot 44. This allows movable wall 62 to move downwardly, and causes blade 68 to approach blade 108 under the action of rubber band 102, as shown in FIG. 5. The rodent's neck is then caught in the narrow space 112 betwen the edge 70 of blade 68 and the edge of blade 108. The rubber band causes blade 68 to exert a continuous pressure on the rodent's neck, thereby strangling the rodent and promptly killing it.

Because the blade means are located a substantial distance from entrance opening 60, substantially the entire body of the rodent is located within the tunnel-like passageway 110. Consequently, the entire trap can simply be picked up and thrown away, with the rodent in it, without contacting the rodent directly.

The trap is sufficiently inexpensive to make that it can be considered disposable. The low manufacturing cost of the trap arises from various factors, and primarily from the fact that substantially all of the parts of the trap are integrally molded together as a unit, and also by reason of certain structural features, and particularly the fact that blade 68 is secured to and extends inwardly from movable wall 62, thereby forming a strangulation device which is extremely simple yet highly effective. The trap is completely safe for children, since it is impossible for them to place their fingers in the strangling mechanism when the trap is in the set condition. The trap is set simply by grasping elements 78 and 80, pulling them upwardly, and causing them to rest respectively on detent edges 38 and 42. The user's fingers come nowhere near the strangling mechanism, and consequently the trap is completely safe for the person setting it.

Once the trap is set, it is unlikely to be triggered accidentally, particularly inasmuch as the trigger bar 74 is inside the trap.

The trap kills rodents reliably, because they must have their necks in position to be strangled in order to reach trigger bar 74.

Figure 6:
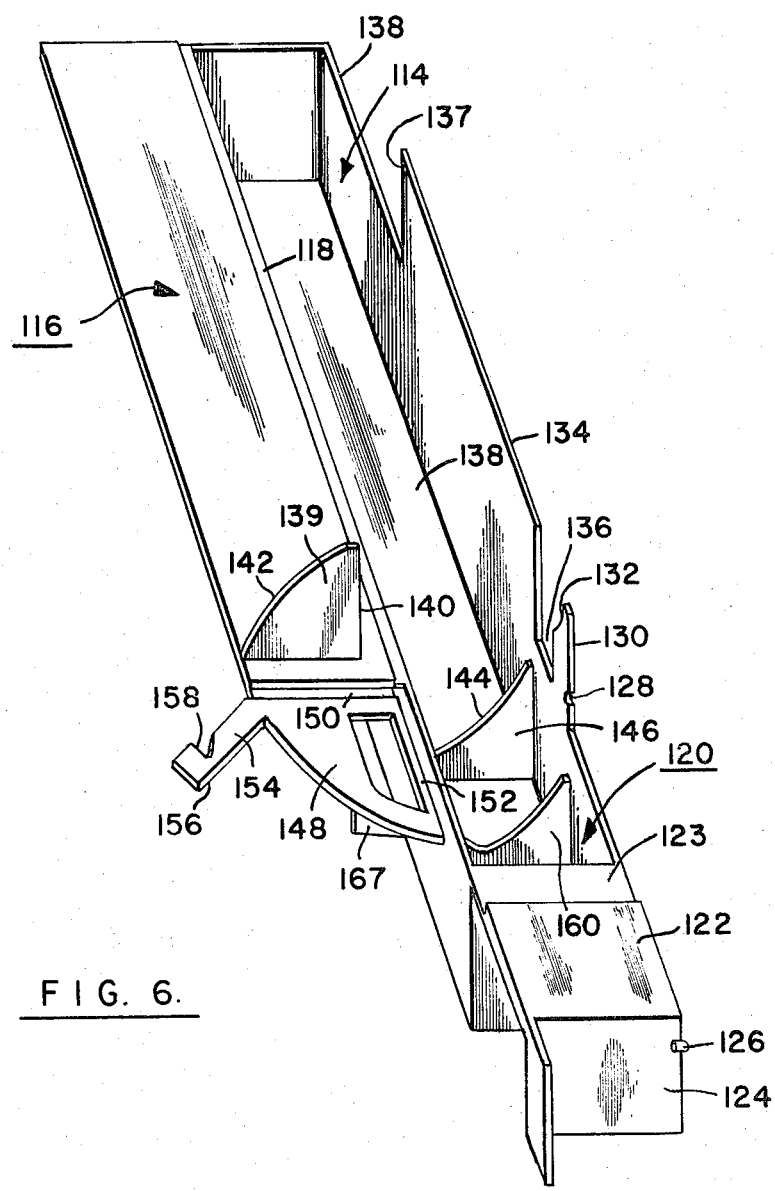
FIG. 6 is an oblique perspective view of a trap in accordance with another embodiment of the invention.
Figure 7:
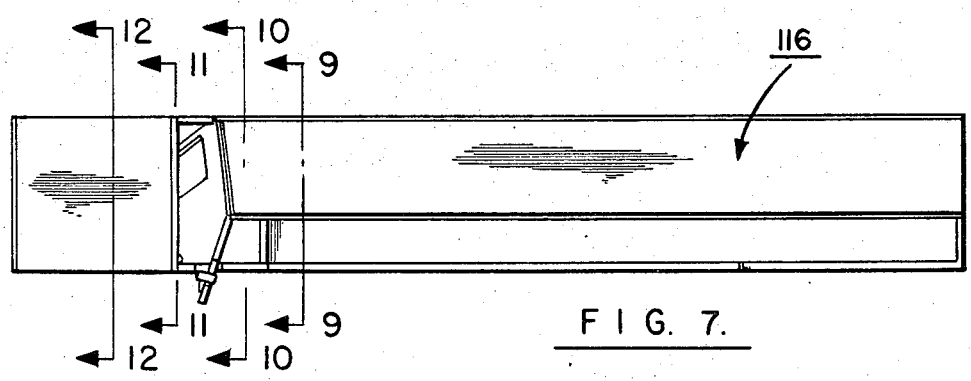
FIG. 7 is a top plan view of the trap of FIG. 6 in its set condition.

The alternative version of the trap, as shown in FIG. 6, comprises an elongated, open-top box, generally indicated at 114, having a cover 116 connected by an integrally molded hinge 118 to the upper edge of one of the long vertical sides of the box. A bait compartment 120 is provided at one end of the box, and a bait compartment cover 122 is connected to the upper edge of a short side of the box by integrally molded hinge 123. Cover 122 is L-shaped, and has a perpendicular baffle 124 for preventing an animal from gaining direct access to the trigger mechanism of the trap from the exterior. A projection 126, formed in baffle 124, cooperates with a dimple 128 formed in upstanding member 130 to hold the bait compartment cover in place, when closed.

Upstanding element 130 has a curved edge 132, which serves as a detent for the trigger mechanism. A wall 134 extends upwardly from the side of the box opposite hinge 118, and is spaced longitudinally from upstanding detent member 130 to provide a slot 136, which, as will be seen, allows the trigger mechanism to operate.

Wall 134 has a vertical edge 137, which is spaced from the entrance end of the trap to allow the animal to enter the trap by climbing over edge 138 of wall 134.

Figure 9:
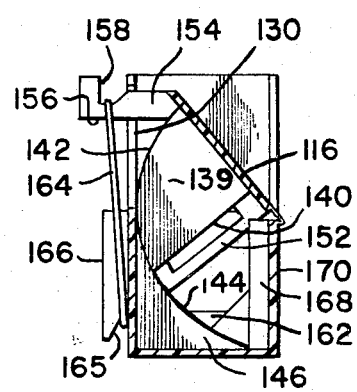
FIGS. 9, 10, 11 and 12 are vertical sections taken on a series of transverse planes as indicated in FIG. 7.

A blade 139 is integrally molded with cover 116. It has an edge 140 for engaging the neck of the rodent, and a curved edge 142, which conforms with the edge 144 of barrier 146 (as shown in FIG. 9).

Trigger mechanism 148 is connected to an end of cover 116 by an integrally molded hinge 150. A trigger bar is provided at 152 for actuation by the rodent. Element 154 projects from trigger mechanism 148, and has an edge 156 for engaging detent edge 132 of upstanding member 130. It also has a notch 158 for receiving a rubber band which is used to urge the cover in the closing direction. The rubber band 164, as best seen in FIGS. 9 and 10, extends from notch 158 to a downwardly facing notch 165 formed in element 166, which projects outwardly from wall 134 approximately below the location of element 130.

As shown in FIG. 6, trigger mechanism 148 has a downward projection 167. This projection serves the same purpose as that served by projections 92 and 94 in FIG. 1. That is, by engagement with bait compartment cover 122 it prevents the cover 116 from being opened beyond certain limits when the trap is set.

Figure 8:
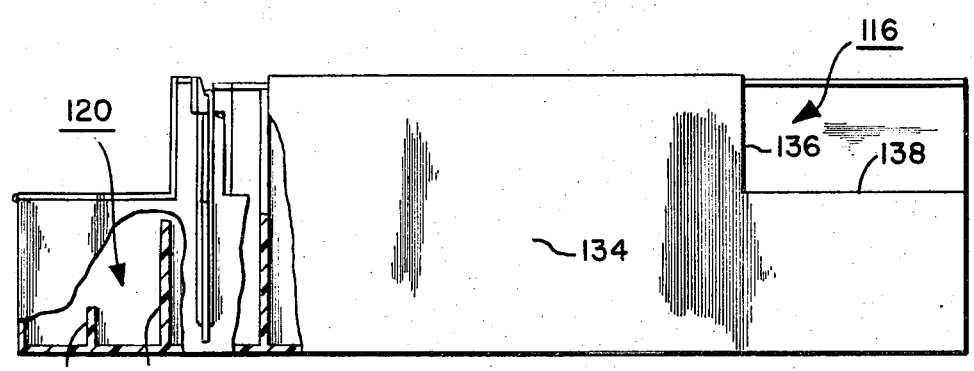
FIG. 8 is a side elevation, partly in section, showing the trap of FIG. 7.
Figure 11:
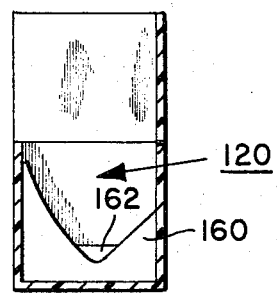
Figure 12:
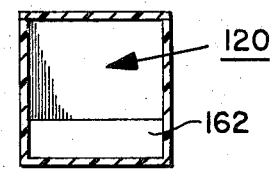

As best seen in FIGS. 8, 11 and 12, the bait compartment 120 comprises a V-shaped baffle 160, and a second, lower baffle 162. Baffle 160 prevents the rodent from reaching the bait compartment without having to actuate trigger bar 152. Baffle 162 insures that the bait will remain in the farmost part of bait compartment 120.

Figure 10:
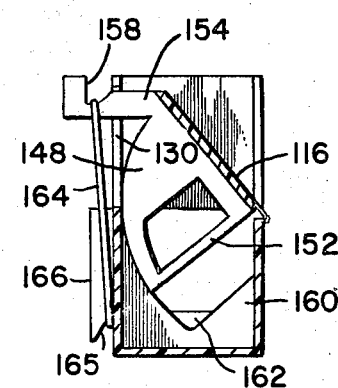

The trap is shown in its set condition in FIGS. 8, 9 and 10. Projection 154 rests on the detent edge of upstanding member 130 until trigger bar 152 is pulled.

In operation, the rodent enters the trap by climbing over edge 138 of wall 134, and approaches the bait compartment through an elongated, tunnel-like passageway formed by the box and its partially opened cover 116. The animal cannot enter the trap forward of edge 136. The distance between edge 136 and the trigger mechanism is sufficiently long that the animal's body is substantially completely within the trap when its mouth is in contact with trigger bar 152.

When the animal is within the trap, what it sees is what is shown in FIG. 9. In order to reach the bait behind baffle 162, it will attempt to move bar 152 out of the way by pulling it. This causes projection 154 to become disengaged from detent edge 132 of member 130. The rubber band 164, then causes the cover to move in the closing direction, and causes edge 140 of blade 139 to approach cooperating blade 168, which is integrally formed on wall 170 of the box. Blades 139 and 168 are positioned opposite each other and are spaced from the trigger bar by a distance such that the animal's neck is caught between the two blades when the trigger bar is actuated. The rodent is killed by strangulation in the same manner as is accomplished by the trap of FIGS. 1–5. At the same time, cover 116 moves in the closing direction, thereby enclosing the dead animal almost completely so that the trap with the dead animal in it can be disposed of without the need for viewing or handling of the animal.

The trap of FIGS. 6–12 has all of the advantages of the trap of FIGS. 1–5, and the additional advantage that it can be manufactured in a mold of smaller dimensions as a result of the fact that the cover is hinged along a long dimension of the box. It also has the advantage that it lacks an opening corresponding to opening 60, and thus is able to enclose the dead animal more completely.

I claim:

1. A portable, disposable rodent trap comprising:
   means providing a housing having an internal, elongated tunnel-like passageway defined by a plurality of elongated walls each having long sides and narrow ends, the long sides extending in the direction of the length of the passageway said passageway having an entrance opening through which a rodent can enter the passageway;
   means, secured within the passageway, for strangling the rodent; and
   means, triggerable by the rodent, for activating said strangling means;
   said strangling means being located at a distance from said entrance opening such that substantially the entire body of the rodent is located within the passageway when the strangling means is activated and in contact with the neck of the rodent;

in which one of the elongated walls defining the passageway is a movable wall connected to the other parts of the housing by a hinge;

the strangling means comprises a blade having an edge extending in a direction transverse to the direction of elongation of the passageway, and means opposed to the edge of the blade, said blade and opposed means being relatively movable toward each other whereby the neck of the rodent can be compressed between the blade edge and the opposed means;

one of said blade and said opposed means constitutes part of said movable wall and is located at an location along the length of said movable wall and spaced from the narrow ends thereof, and the other constitutes part of another wall of said passageway;

and including means connected to said triggerable means for urging the movable wall in a direction such that the edge of the blade means and the opposed means approach each other, and releasable detent means for holding the movable wall in a first position such that the rodent can move its head between the blade edge of the opposed means;

and in which said triggerable means comprises means actuable by the rodent, when its neck is located between the blade edge and the opposed means, for releasing the detent means, whereby the urging means causes the blade edge and the opposed means to approach each other compressing the rodent's neck and choking the rodent to death.

2. A trap according to claim 1 in which said movable wall, said blade, and at least all of said means except said urging means are composed of a synthetic plastic and molded as a unit, said movable wall being openable to an extent such as to permit release of the trap from the mold, and in which said hinge is an integrally molded flexible hinge.

3. A trap according to claim 2 in which the means actuable by the rodent is an element hinged to the movable wall, and in which the releasable detent means comprises first means fixed to the hinged element, and second means fixed to a portion of the housing other than the movable wall, said second means being cooperable with said first means to hold the movable wall in said first position.

* * * * *